(12) United States Patent
Gwen (10) Patent No.: US 11,731,888 B1
(45) Date of Patent: Aug. 22, 2023

(54) BOTTLE FOR USE IN A DRINKING WATER MINERALIZATION SYSTEM

(71) Applicant: CORE PACIFIC INC., Houston, TX (US)

(72) Inventor: Patrick Gwen, Houston, TX (US)

(*) Notice: Subject to any disclaimer, the term of this patent is extended or adjusted under 35 U.S.C. 154(b) by 0 days.

(21) Appl. No.: 17/815,323

(22) Filed: Jul. 27, 2022

(51) Int. Cl.
| | |
|---|---|
| C02F 1/68 | (2023.01) |
| B65D 1/02 | (2006.01) |
| C02F 1/00 | (2023.01) |
| B65D 47/12 | (2006.01) |
| C02F 1/44 | (2023.01) |
| B65D 51/16 | (2006.01) |

(52) U.S. Cl.
CPC ............ *C02F 1/686* (2013.01); *B65D 1/0246* (2013.01); *B65D 47/122* (2013.01); *B65D 51/1616* (2013.01); *C02F 1/003* (2013.01); *C02F 1/441* (2013.01)

(58) Field of Classification Search
CPC .......... C02F 1/686; C02F 1/003; C02F 1/441; B65D 1/0246; B65D 47/122; B65D 51/1616
See application file for complete search history.

(56) References Cited

U.S. PATENT DOCUMENTS

| | | | |
|---|---|---|---|
| 3,291,331 A * | 12/1966 | Grisham | B65D 77/283 215/388 |
| 3,968,872 A | 7/1976 | Cavazza | |
| 4,785,931 A | 11/1988 | Weir | |
| 5,122,272 A * | 6/1992 | Iana | A45F 3/16 210/473 |
| 5,381,930 A * | 1/1995 | Kalabakas | G01F 11/286 222/205 |
| 5,958,228 A | 9/1999 | Tokushima | |
| 6,003,728 A | 12/1999 | Elliott | |
| 6,098,795 A | 8/2000 | Mollstam | |
| 6,372,270 B1 | 4/2002 | Denny | |
| 7,279,187 B2 | 10/2007 | Daniels | |
| 2004/0173556 A1* | 9/2004 | Smolko | B65D 81/3886 215/11.5 |
| 2005/0003058 A1 | 1/2005 | Prabhakar | |
| 2009/0053365 A1 | 2/2009 | Hurwitz | |
| 2009/0188886 A1 | 7/2009 | Troesch | |
| 2009/0234317 A1 | 9/2009 | Navarro | |

(Continued)

FOREIGN PATENT DOCUMENTS

WO WO-2021074478 A1 * 4/2021

*Primary Examiner* — Terry K Cecil
(74) *Attorney, Agent, or Firm* — Egbert, McDaniel & Swartz, PLLC (57) ABSTRACT

A bottle for use with a system for mineralizing drinking water has a body and an inner cap fixedly positioned in the opening of the body. The body has a neck extending outwardly therefrom. The neck defines an opening at the upper end of the body. The inner cap has an upper surface affixed over the opening of the body. The inner cap has an annular portion extending downwardly from the upper surface. The annular surface bears against an inner wall of the neck of the body. The inner cap has a receptacle opening at the upper surface. The inner cap has a channel extending downwardly therefrom so as to open to the interior volume of the body. A straw extends through the channel and into the interior volume of the body so as to have an end position in proximity to the bottom of the body.

12 Claims, 7 Drawing Sheets

(56) References Cited

U.S. PATENT DOCUMENTS

| | | |
|---|---|---|
| 2010/0089860 A1 | 4/2010 | Wiggins |
| 2014/0017363 A1 | 1/2014 | Aibe |
| 2021/0155385 A1* | 5/2021 | Schuster ............ B65D 51/1616 |

* cited by examiner

BOTTLE FOR USE IN A DRINKING WATER MINERALIZATION SYSTEM

CROSS-REFERENCE TO RELATED APPLICATIONS

Not applicable.

BACKGROUND OF THE INVENTION

1. Field of the Invention

The present invention relates to bottles. More particularly, the present invention the relates to bottle that contain minerals or supplements in liquid form. More particularly, the present invention the relates to bottles containing a mineral or supplement therein which can be used in a system for mineralizing drinking water.

2. Description of Related Art Including Information Disclosed Under 37 CFR 1.97 and 37 CFR 1.98

In the art of water treatment, it is well-known to purify water for human consumption by implementing specific purifying processes. These purifying processes include, for example, the processes of filtration, sedimentation, bacterial digestion, distillation and reverse osmosis. In reverse osmosis, for example, a volume of liquid containing contaminants is introduced into a chamber on one side of a semi-permeable membrane (i.e. having pores large enough to pass the molecules of the liquid but not those of the solute contaminant). By pressurizing the liquid above its osmotic pressure, the liquid molecules will diffuse across the membrane but the solute molecules will remain. The resulting brine is then discarded and the liquid is thus purified and retained.

Such reverse osmosis systems can be configured to produce purified water from virtually any source and remove many of the contaminants contained therein, including dissolved mineral ions, with great effectiveness. While this is advantageous for many reasons and in many applications, it is nonetheless imperfect for the production of drinking water. Specifically, in the case of a reverse-osmosis process, it is not selective. In other words, it removes all dissolved mineral ions, both those which are desirable for health and taste along with those which are not. In the end, the produced water is a demineralized water free of any mineral ions and without taste.

It is therefore known to pass the demineralized water through a subsequent step for replenishing certain minerals lost and adding other desirable minerals not present in the water prior to the start of the purification process. In particular, calcium, magnesium and bicarbonate are particularly desirable. Their presence in drinking water may contribute to establishing and maintaining physical and mental health. These ions are also partly responsible for creating a pleasant taste in the drinking water.

One such means of doing this is to dissolve a mixture of mineral salts into the water. Commonly employed additives include calcium chloride, magnesium sulphate, chloride, bicarbonate of sodium, and potassium. However, the use of such salts will result in the presence of unwanted chloride, sulfate, sodium and potassium ions which can negatively affect the taste of water and bring a bitter and/or salty taste in the final product. At certain quantities, these can have deleterious effects on the health of certain sensitive customers (i.e. for people having specific diets, for example).

In the past, the minerals that are to be introduced into the filtered water are provided in a pellet form. Typically, the minerals are encapsulated in clay and slowly dissolve into the water. Unfortunately, the quality control of such mineral-bearing clay pellets is often inconsistent and minimal. As a result, the quality of the minerals, the quantity of the minerals, and the rate of mineral diffusion in the drinking water can be relatively uncontrolled. Under certain circumstances, the initial water washing across the mineral-bearing clay pellets will have a large amount of minerals therein. Later passages of water across the mineral-bearing clay pellets will have a lower mineral content. As such, the exact dosing of minerals into the drinking water is unavailable in the prior art.

It is the goal of the mineralization process to mineralize demineralized water with ions and minerals so as to establish and maintain physical and mental health while avoiding the undesirable ones for taste or health issues. It is therefore desirable to provide a means for mineralizing demineralized water with desirable ions, without also adding undesirable amounts, counter-ions and/or compounds.

In many countries, the average diet does not contain sufficient levels of necessary minerals and nutritions, such as, iron, zinc, iodine, vitamin A and vitamin B. Iron deficiency is well documented and is common in most developing countries. Recent evidence suggests that nutritional zinc deficiency may be overcome among the people of many developing countries where they subsist on diets of plant origin (e.g. cereal and legume). Marginal mineral deficiencies may be widespread even in the in the U.S. because of self-imposed dietary restrictions, use of alcohol and serial proteins, and the increasing use of refined foods that decrease the intake of trace minerals.

Many mineral deficiencies can be overcome by taking supplements. Other methods of addressing these deficiencies include increasing the intake of foods naturally containing these minerals or fortifying food and beverage products. Usually, in countries where the people suffer from these deficiencies, the economy is such that providing minerals and vitamins as a supplement is expensive and presents significant distribution logistics problems. In addition, compliance, i.e. having the people take the vitamin and mineral supplements on a daily basis, is a serious problem. Accordingly, the delivery of minerals, along with other vitamins and nutrients, in a form that has high bioavailability and at the same time a non-objectionable taste and appearance, and in a form that would be consumed by high proportion of the population at risk, is desirable.

There are well-recognized problems associated with adding both vitamins and minerals to beverages. Zinc supplements tend to have an objectionable taste, cause distortion of taste and cause mouth irritation. Iron supplements tend to discolor foodstuffs, or to be or organoleptic unsuitable. Moreover, it is particularly difficult to formulate products containing minerals and, in particular, mixtures of available iron and zinc. These minerals not only affect the organoleptic and aesthetic properties of beverages, but also undesirably affect the nutritional bioavailability of the minerals themselves and the stability of vitamins and flavors.

Several problems exist with delivering a mixture of iron and zinc with or without vitamins in a beverage mix. A few of the problems are choosing iron and zinc compounds which are organoleptically acceptable, bioavailable, cost-effective and safe. For example, the water-soluble iron and zinc compounds, which are the most viable available, cause unacceptable metallic aftertaste and flavor changes. In addition, the soluble iron complexes often cause unacceptable color changes. Even further, the iron complexes themselves are often colored. This makes formulating a dry powder that has a uniform color distribution in the mix more difficult. Often, the reconstituted beverage does not have a suitable color identifiable with the flavoring agent. Color and taste are key to consumer acceptance.

An even greater challenge has been faced in providing a mineral fortified drinking water that contains a bioavailable source of iron or zinc mineral. A drinking water, as opposed to a beverage, should contain water as its main ingredient, and which should have the taste and appearance of pure water. Fortification of drinking water with soluble, stable and bioavailable minerals (e.g. iron, zinc) has been a challenge. For example, when the soluble form of iron (ferrous iron) is added to regular water, it rapidly oxidizes to the insoluble trivalent form, which is ferric iron. Subsequently, the ferric iron combines with hydroxide ions to form iron hydroxide (yellow colored), which later converts to ferric oxide, a red, powdery precipitate called rust. Thus, it is well-known that natural water not only oxidizes iron from ferrous to ferric moieties, but also causes the development of undesirable color, poor solubility by precipitation and increased turbidity, compromised bioavailability, and co-precipitation of other minerals (e.g. zinc, magnesium, calcium and phosphate).

The benefits provided by mineral-fortified liquid compositions are clear, but providing these compositions to consumers presents many problems. Specifically, it is often not desirable or economical to prepare, bottle, ship, store and sell a fortified liquid. One such problem is that the minerals and other nutrients can promote the growth of undesirable bacteria and other microbials. Preservatives can be added to the liquid to slow this gradual contamination problem. However, preservatives add cost and are often viewed by consumers as unnatural and therefore contradictory to the concept of drinking a healthy beverage. Thus, it would be far more desirable if the consumer of such a product could prepare the beverage themselves using their own liquid composition.

Accordingly, there exists a need for a mineral fortification system that allows consumers to prepare a mineral fortified drinking water near to the time and place that the mineral-fortified drinking water is to be consumed. The system should provide the mineral, along with any necessary stabilizing compounds, such as a redox modulating composition, in an easily dispensable form. As such, there is a need for providing a proper bottle in which the mineral-fortified liquid can be delivered and mixed with water in a quick, easy and efficient manner and without extensive exposure to the exterior environment.

U.S. patent application Ser. No. 17/815,479 filed on Jul. 27, 2022, now U.S. Pat. No. 11,597,669 to the present inventor, describes an apparatus for the mineralization of drinking water. This apparatus has a housing with an inlet and an outlet, a filter positioned in the housing, a container receptacle assembly affixed to or formed on the housing, a pump cooperative with the container receptacle assembly, and a manifold connected to an outlet of the pump and to an outlet of the filter. The filter is connected to the inlet of the housing and adapted to filter contaminants. The container receptacle assembly is adapted to connect with a bottle containing a mineral or supplement therein. The pump is adapted to pass the mineral or supplemented in a measured amount from the bottle. The manifold is adapted to mix the mineral or supplement with the filtered water so as to discharge a mineralized drinking water through the outlet.

Importantly, a specialized bottle is used in association with this system. The bottle is adapted to be easily engaged with the system so that the mineral-containing liquid from the bottle can be easily mixed with filtered tap water in order to present a properly mineral fortified drinking water. The present application is directed to such a bottle.

In the past, various patents and patent application publications have issued with respect to bottles for providing liquid-based minerals. For example, U.S. Pat. No. 3,968,872, issued on Jul. 13, 1976 to C. Cavazza, describes a dispenser and dispenser closure for storing to products separately in a necked container for eventual mixing thereof and dispensing them as a mixture. A sealed cup-shaped plug closes the container and has a bottom that is punchable or pierceable. The container contains a first material that is to be mixed with a second material contained in the cup-shaped plug externally of the container interior. A dispensing element (which is a tubular punching piston) is disposed slidably axially in the cup and is provided with a leading edge at an inner open and for punching and piercing the bottom of the plug so as to introduce the second material into the container upon being depressed. The punching piston fixed therein is coaxial with a dispensing tube open at both ends. A removable cover closes an outer end of the tube and is removed therefrom automatically upon the punching piston being displaced.

U.S. Pat. No. 4,785,931, issued on Nov. 22, 1988 to Weir et al., teaches a closure for use with a beverage container. The closure has a plurality of compartments formed therein to store quantities of a flavoring agent separately from a mixing fluid (such as water) contained in the container. The compartments are operable by simple finger pressure to release their contents into the container one at a time for the purpose of making a flavored beverage.

U.S. Pat. No. 5,958,228, issued on Sep. 28, 1999 to Tokushima et al., describes an apparatus for producing a mineral water. This apparatus is provided with a mineral source having a mineral element containing a soluble mineral component. Plain water is supplied to the mineral source. The mineral composition dissolves in the plain water when the soluble mineral of the mineral element is brought into contact with plain water. Ultrasonic waves are applied to the mineral source by an ultrasonic source. The conditions for applying ultrasonic waves to the mineral source is controlled to prepare a mineral water which contains a mineral component according to a user's requirements.

U.S. Pat. No. 6,003,728, issued on Dec. 21, 1991 to J. Elliott, provides a dispensing structure for a container. This dispensing structure has an opening to the interior of the container. The dispensing structure includes a body for extending around the container opening and defining an access passage or access through the container opening. The body includes a chamber for receiving an additive product for adding to the container. The chamber has an initially closed upper end and has a bottom end defining a bottom end opening. A movable, bottom end closure is provided for releasably closing the chamber bottom end opening.

U.S. Pat. No. 6,098,795, issued on Aug. 8, 2000 to Mollstam et al., describes a device for adding a component to a package. The device keeps the first component from the second component until a selected time for use. The device includes a delivery package which is mountable on the outside surface of the main package and has a delivery opening, a control opening, and a cavity extending between the delivery opening and the control opening. A compartment that contains a first component is mounted inside the cavity so that it seals the delivery opening with a puncturable seal. A puncture device is controllable by a user through the control opening for cutting through the compartment so as to release the first component into the main package at the selected time.

U.S. Pat. No. 6,372,270, issued on Apr. 16, 2002 to S. P. Denny, shows a drink mix apparatus for making personal quantities of beverage. This apparatus includes a cap assembly having an outer attachment portion and a plunger portion fitting within the attachment portion. The two portions define a chamber therein containing a dry mix. A seal is provided to prevent mixing of the drink mix and water within the bottle until desired. When the plunger is pushed downwardly, it drives the drink mix through the seal, bursting the seal and deploying the drink mix into the water within the bottle.

U.S. Pat. No. 7,279,187, issued on Oct. 9, 2000 to Daniels et al., shows a mineral fortification system that has a bottlecap, a pouch and a pouch opener. A powder is contained within the pouch. The powder contains at least one mineral and a redox modulating compound. When the cap is secured onto the opening of the bottle containing the liquid and when the pouch opener is activated, the powder is released from the pouch and mixes with the liquid to form a mineral fortified liquid composition that is fortified with at least one mineral and has a pH between about 2.5 and 9.5.

U.S. Patent Application Publication No. 2005/0003058, published in Jan. 6, 2005 to S. M. Prabhakar, teaches a single-use beverage container having a variable-volume package, a lower section and an upper section. The variable-volume package encloses a variable volume and has a first portion and a second portion. The lower section has a side wall and a bottom and is sealingly coupled to the first portion at the side wall or at the bottom. The upper section is sealingly coupled to the bottom section. The variable-volume package contains dispersible material that may be controllably injected into the container so as to modify a feature of the contents of the container.

U.S. Patent Application Publication No. 2009/0053365, published on Feb. 26, 2009 to Hurwitz et al., discloses a liquid-containing vessel that is provided with one or more peel-away packages housing nutritional and supplement ingredients. The packages are made from sealed polyethylene film having a continuous aluminum coating. Each of the packages has a notch therein to facilitate tearing. One or more packages are torn open and the ingredients contained therein are emptied into the bottled water to create a custom beverage. The nutritional ingredients can include a vitamin and/or mineral composition or an electrolyte composition.

U.S. Patent Application Publication No. 2009/0188886, published on Jul. 30, 2009 to Troesch et al., provides a liquid container system that can be applied to a bottle. Mini-receptacles are provided and filled with respect to substances which are broken open by external manipulation into the container.

U.S. Patent Application Publication No. 2009/0234317, published on Sep. 17, 2009 to L. M. Navarro, teaches a flexible, flat pouch with a port for mixing and delivering a powder-liquid mixture. The pouch body includes opposing first and second major flexible walls sealed to one another along respective peripheries so as to define an internal chamber and a pouch perimeter. The pouch body has a C-shape. The port body projects from the first wall and is fluidly open to the internal chamber. With this configuration, various components can be mixed by pressing the walls in a kneading fashion. The resulting composition is dispensed through the port body.

U.S. Patent Application Publication No. 2010/0089860, published on Apr. 15, 2010 to Wiggins, describes an apparatus for delivering a nutritive substance. This apparatus comprises a container body having a base at one end thereof, an upper portion adapted for removable receipt of the closure, an upper portion defining an opening therein, and a chamber defined by the container body. The chamber is in fluid communication with the upper portion opening. A seal is bonded across the upper portion opening of the container and is adapted to provide an airtight seal across the opening. A nutritive substance is coated onto an element selected. The seal prevents contact between the nutritive substance and the contents of the container until the seal is removed or pierced.

U.S. Patent Application Publication No. 2014/0017363, published on Jan. 16, 2014 to Aibe et al, provides a bottle drink having a cap and a bottle where a granular supplement containing multiple constituents in a stable manner is stored. A solution is provided that is suitable for dispersing the granules in the bottle. The granules contain mutually incompatible multiple chemical agents or nutritional constituents whose surface is coated with polyglyceryl fatty acid ester.

It is an object of the present invention to provide a bottle for a water mineralization system that effectively re-mineralizes water.

It is another object of the present invention to provide a bottle for a mineralization system that produces a healthy water output.

It is another object of the present invention to provide a bottle for a mineralization system which avoids the use of chemicals.

It is another object of the present invention to provide a mineralization system that produces no residue.

It is another object of the present invention to provide a bottle for a mineralization system that consistently introduces minerals into water.

It is another object of the present invention to provide a bottle for a mineralization system that provides consistent dosing of the minerals into the water.

It is another object the present invention to provide a bottle for a mineralization system that promotes better vitamin and mineral absorption than the use of pills, tablets and pellets.

It is another object of the present invention to provide a bottle for a mineralization system that is convenient and easy to use.

It is another object the present invention to provide a bottle for a mineralization system that prevents bacterial contamination.

It is another object of the present invention to provide a bottle for a mineralization system that allows the user to set the rate and type of dosing.

It is another object the present invention to provide a bottle for a mineralization system that relies upon liquid dosing and avoids the use of mineral-containing clay pellets.

It is another object of the present invention to provide a bottle for a mineralization system which has a precise output.

It is a further object of the present invention to provide a bottle for a mineralization system that allows for simple and easy placement of the mineral or supplement-containing bottle.

It is a further object of the present invention to provide a bottle for a mineralization system that assures proper positioning of the mineral or supplement-containing bottle.

It is still a further object of the present invention to provide a bottle for a mineralization system that assures a proper suction of the mineral-containing liquid from the bottle and into the treated water.

These and other objects and advantages of the present invention will become apparent from a reading of the attached specification and appended claims.

BRIEF SUMMARY OF THE INVENTION

The present invention is a bottle for use with a system for mineralizing the drinking water. This bottle comprises a body having a neck extending outwardly therefrom and an inner cap fixedly positioned in the opening of the neck of the body. The neck defines an opening at the upper end of the body. The body has a bottom and an interior volume. The inner cap has an upper surface affixed over the opening of the body. The inner cap has an annular portion extending downwardly from the upper surface. The annular surface bears against an inner wall of the neck of the body. The inner cap has a receptacle opening at the upper surface. The inner cap has a channel extending downwardly therefrom so as to open to the interior volume of the body.

In the present invention, the inner cap has a straw extending through the channel and into the interior volume of the body. This straw has an end positioned in proximity to the bottom of the body. The straw has an upper end opening at the receptacle.

The upper surface of the inner cap has a hole formed therethrough. The hole has an air filter material covering the hole or positioned within the hole at the upper surface of the inner cap. The air filter material is adapted to allow flow into the interior volume of the body and to block airborne contaminants from entering the interior volume of the body.

In the preferred embodiment the present invention, the inner cap is formed of an elastomeric material. The body is formed of a glass material.

The neck of the body has at least one ridge or thread extending outwardly of an outer diameter of the neck. A cap is threadedly and removably positioned over the opening at the upper end of the body. A mineral or supplement-containing liquid is received in the internal volume of the body.

The present invention is also an apparatus that includes a system adapted to filter and mineralize water. The system has a container receptacle assembly formed or affixed thereto. This container receptacle assembly has an inlet. The apparatus includes a bottle having a neck extending outwardly therefrom. The neck defines an opening an upper end of the body. An inner cap is fixedly positioned in the opening of the body. This inner cap has an upper surface affixed over the opening of the body. The inner cap has an annular portion extending downwardly from the upper surface. The annular surface bears against an inner wall of the neck of the bottle. The inner cap has a receptacle opening at the upper surface. The inner cap has a channel extending downwardly therefrom so as to open to the interior volume of the bottle. The inlet of the container receptacle assembly is positionable in the receptacle of the inner cap and is adapted to draw a liquid from the bottle and pass the liquid into the system.

In this apparatus, the system has a bracket affixed thereto. This bracket defines an upper yoke and a lower yoke. The lower yoke releasably engages the neck of the bottle. The inlet of the container receptacle assembly has a nipple thereon. The nipple is releasably received in the receptacle of the inner cap. A straw extends through the channel and into the interior volume of the body. The nipple of the inlet of the container receptacle assembly is in releasable communication with the straw.

The upper surface of the inner cap has a hole formed therethrough. This hole has an air filter material covering the hole or installed within the hole at the upper surface of the inner cap. This air filter material is adapted to allow airflow into the interior volume of the body and the block airborne contaminants from entering the interior volume of the body.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
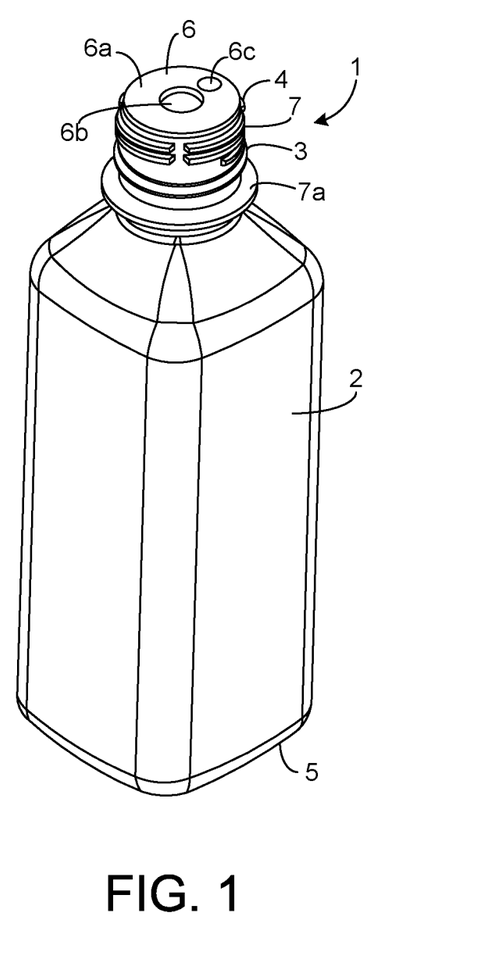
FIG. 1 is an upper perspective view of the bottle in accordance with the teachings of the present invention.

Referring to FIG. 1, there shown the bottle 1 of the present invention for use in a system for mineralizing drinking water (as shown in FIGS. 3-9 herein). The bottle comprises a body 2 having a neck 3 extending outwardly therefrom. The neck 3 defines an opening 4 at an upper end of the body 2. The body 2 has an interior volume and a bottom 5.

An inner cap 6 is fixedly positioned on the opening 4 of the body 2. The inner cap 6 has an upper surface 6a affixed over the opening 4 of the body 2. The inner cap 6 has a receptacle 6b opening at the upper surface 6a. A hole 6c is also formed in the upper surface 6a of the inner cap 6. Hole 6c opens to the interior volume of the body 2.

FIG. 1 shows that the neck 3 has threads 7 formed on the outer diameter thereof. Threads 7 are adapted to receive a cap. The cap (not shown) can be threadedly and releasably engaged with the threads 7 so as to seal the receptacle 6b and the hole 6c during transport and storage of the bottle 1. The cap can be removed so as to expose these elements. There is a ridge 7a extending outwardly of neck 3. As will be described hereinafter, the ridge 7a is adapted to be received by a lower yoke of a bracket associated with the water mineralization system.

Figure 2:
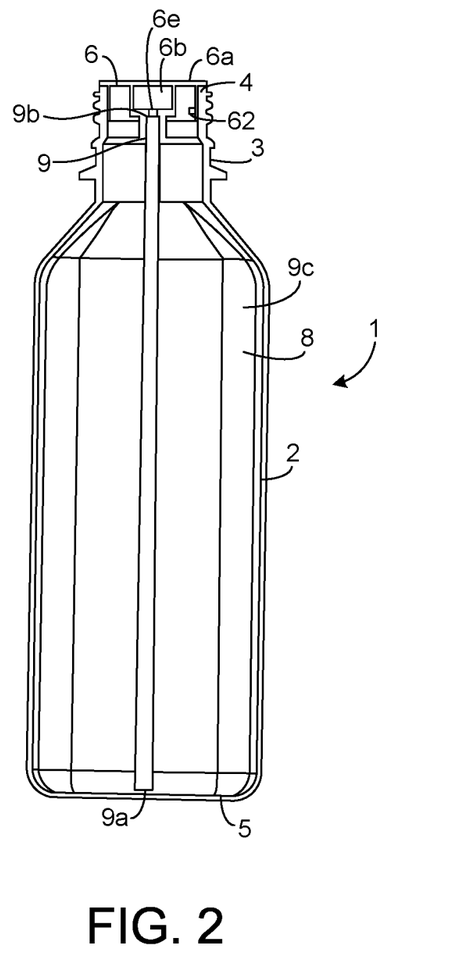
FIG. 2 is a cross-sectional view of the bottle in accordance with the teachings of the present invention.

FIG. 2 is a cross-sectional view of the bottle 1. In particular, bottle 1 is illustrated as having a body 2 and an interior volume 8. The neck 3 is formed at the upper end of the bottle 1 and extends from the body 2. The inner cap 6 is placed over the opening 4 at the upper end of the neck 3. The inner cap 6 has an upper surface 6a that is affixed over the opening 4 of the bottle 1. The inner cap 6 has an annular portion 6d extending downwardly from the upper surface 6a. This annular surface 6d bears against an inner wall of the neck 3 of the body 2. The inner cap 6 has receptacle 6b opening at the upper surface 6a. The inner cap 6 has a channel 6e extending downwardly therefrom so as to open to the interior volume 8 of the body 2.

A straw 9 extends to the channel 6e and into the interior volume 8 of the body 2. The straw 9 has an end 9a positioned in proximity to the bottom 5 of the body 2. The straw 9 has an upper end 9b opening at the receptacle 6e.

With reference to FIG. 1 and in relation to later descriptions of the bottle 1, it should be noted that the hole 6c is formed through the upper surface 6a of the inner cap 6. This hole has an air filter material covering the hole 6c at the upper surface 6a of the inner cap 6. This air filter material is adapted to allow air flow into the interior volume of the bottle and to block airborne contaminants from entering the interior volume 8 of the bottle 1. The hole 6c can also have the air filter material positioned on an interior of the hole.

In the present and preferred embodiment the present invention, the inner cap 6 is formed of an elastomeric material. The bottle 1 is formed of a glass material. The thread 7 and the ridge 7a extend outwardly of the outer diameter of the neck 3. A mineral or supplement-containing liquid 9c received in the interior volume 8 of the bottle 1.

Figure 3:
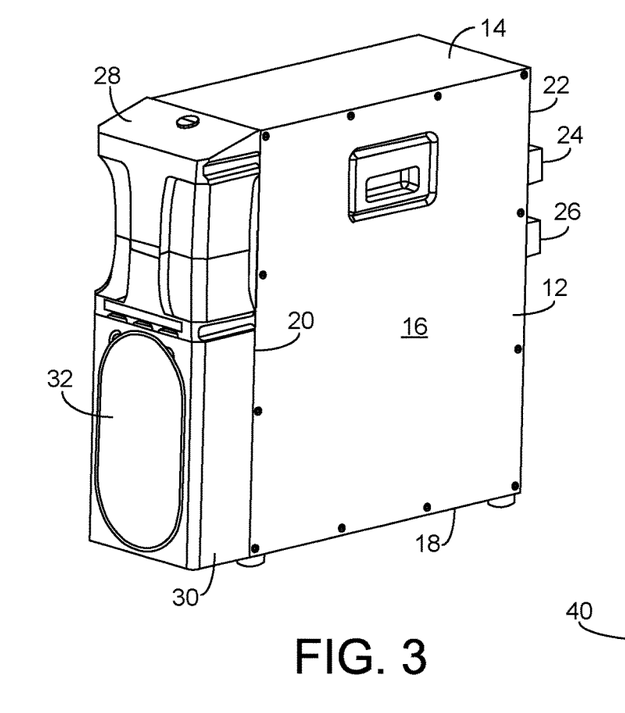
FIG. 3 is an upper perspective view of the water mineralization system as used in association with the bottle of the present invention.

Referring to FIG. 3, there shown a water mineralization system 10 as used with the bottle of the present invention. The water mineralization system 10 includes a housing 12 having a generally rectangular cubicle configuration. In particular, housing 12 has upper surface 14, side wall 16, bottom 18, front wall 20 and back wall 22. Walls 14, 16, 18 and 20 enclose the assembly for the treatment of water. In particular, in FIG. 3, the back wall 22 includes an inlet connection 24. Inlet connection 24 is adapted to allow tap water to be introduced into the interior of the housing 12. A support 26 is illustrated below the inlet 24. Support 26 is configured so as to support a line extending for the introduction of tap water into the housing 12. An outlet for the mineralized drinking water is positioned on a side of the inlet 24 (not shown in FIG. 3).

In FIG. 3, it can be seen that there is a first cover 28 that is positioned against the front wall 20 of the housing 12. This first cover 28 extends over the mineral or supplement-containing bottles 1 used in the dosing of minerals into the drinking water. Cover 28 is removably positioned adjacent to the upper surface 14 of the housing 12. A second cover 30 is positioned against the front wall 20 of the housing 12 and extends so as to be positioned generally adjacent to the bottom 18 of the container 12. Second cover 30 is intended to removably cover the filters contained within the housing 12. In particular, second cover 30 can include a flap or surface 32 that can be specifically removed from the cover 30 so as to allow direct access to the filters within the housing 12.

Figure 4:
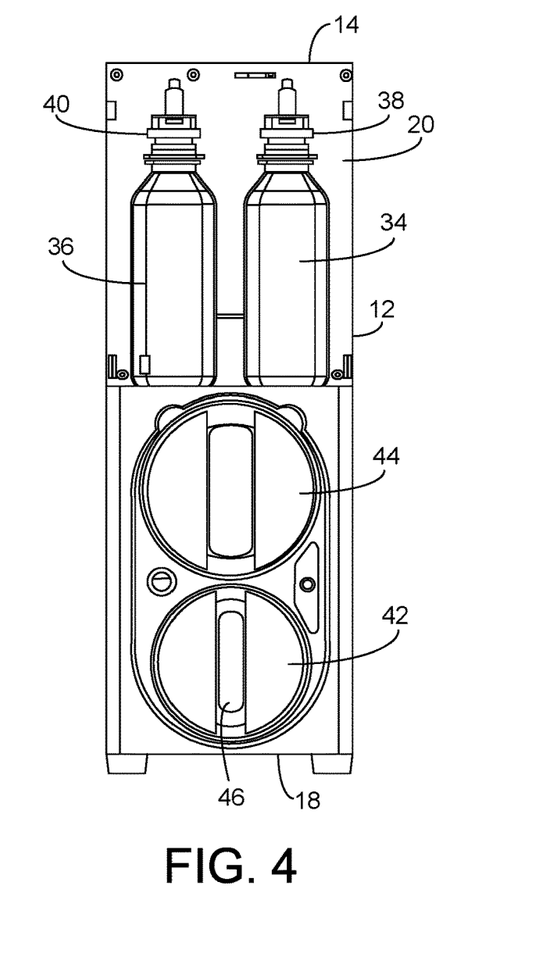
FIG. 4 is a front end view of the water mineralization system as used in association with the bottle of the present invention with the covers removed therefrom.

FIG. 4 shows the configuration at the front wall 20 of the housing 12. In FIG. 4, it can be seen that there is a first bottle 34 and a second bottle 36 that are positioned adjacent to the top 14 of housing 12. These bottles 34 and 36 have a configuration shown by bottle 1 in FIGS. 1 and 2. Each of the bottles 34 and 36 are connected to container receptacle assemblies 38 and 40. The container receptacle assemblies 38 and 40 have a unique configuration which is described in greater detail herein in association with FIGS. 7-9. The bottles 34 and 36 are removably connected respectively to the container receptacle assemblies 38 and 40. The bottles 34 and 36 can contain minerals and/or supplements therein. In particular, one of the bottles can contain one type of mineral and the other bottle can contain another type of mineral. As such, through a control system, the filtered drinking water can be dosed with a desired quantity of the minerals or supplements from bottle 34 and a desired quantity of the minerals or supplements from bottle 36. If necessary, the control system can be actuated so as to prevent any of the minerals in either of the bottles 34 and 36 from entering the system. The controls can also be adapted to control the rate at which the minerals pass from the bottles 34 and 36 into the filtered water within the interior of the housing 12.

FIG. 4 shows the front wall 20 of the housing 12 with the second cover 30 removed. The removal of the second cover 30 exposes a first filter 42 and a second filter 44. The end of the first filter 42 is exposed at the front wall 20 so that the handle 46 of first filter 42 can be accessed. As such, if it is desired to remove or repair the first filter 42, it is only necessary to remove the cover 30 (or flap 32), access the handle 46, rotate the handle 46 and slide the first filter 42 out of position. A similar action can occur with respect to the second filter 44.

The first filter 42 is a pretreatment filter or a carbon filter. The second filter 44 is a reverse osmosis filter. When the first filter 42 is a pretreatment filter, the tap water entering the inlet 24 of the housing 12 will flow in this pretreatment filter so that the pretreatment filter can provide an initial treatment to the water and remove sediment and other contaminants therefrom. The water will flow from the pretreatment filter 42 into the reverse osmosis filter 44 for further removal of any metals, chemicals, contaminants or ions from the water. Importantly, each of the first filter 42 and second filter 44 is located adjacent to the bottom 18 of the housing 12. The first filter 42 and the second filter 44 are also located below the bottles 34 and 36 and located below the container receptacle assemblies 38 and 40. This arrangement greatly improves efficiency in terms of the management of the filters and the bottles. The ease of accessibility of the filters 42 and 44 greatly improves efficiency in the water treatment process and the repair or replacement of the filters.

Figure 5:
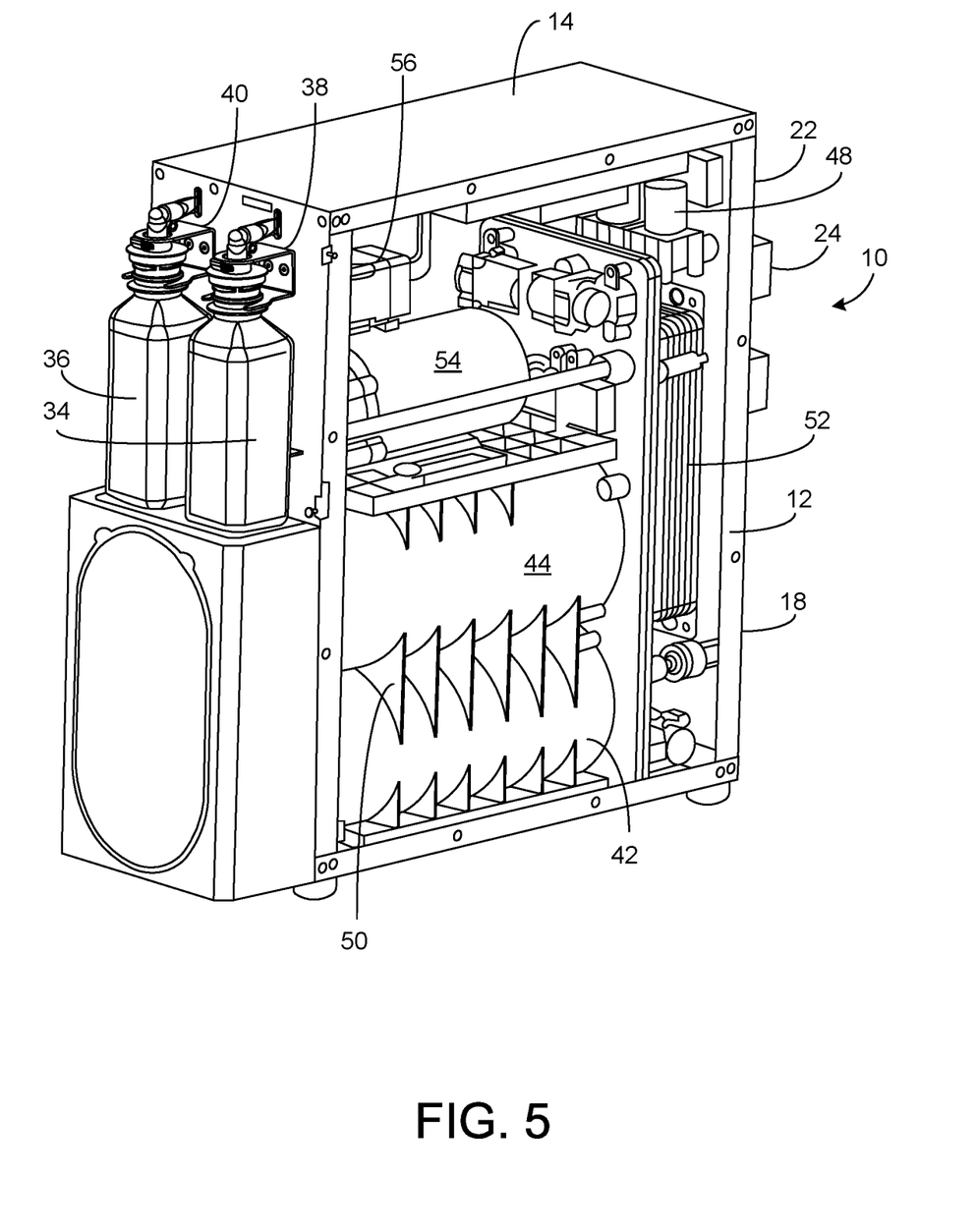
FIG. 5 is an upper perspective view of the water mineralization system as used in association with the bottle of the present invention showing the interior of the housing and the equipment within the interior of the housing.

FIG. 5 further shows the water mineralization system 10 as used with the bottle of the present invention. In particular, FIG. 5 shows that the inlet 24 at the back wall 22 of housing 12 has a valve 48 associated therewith. Valve 48 is movable between an open position and a closed position. In the closed position, tap water flow into the interior of housing 12 is blocked. In the open position, tap water flow into the interior of the housing 12 is permitted. The valve 48 is easily accessible so as to allow water flow to be immediately turned off in the event that leaks should occur or in the event that leak detection equipment within the interior of the housing 12 should signal a leak. This avoids the need to locate the source of the water flow in order to stop the water flow to the water mineralization system 10.

In FIG. 5, it can be seen that the first filter 42 and the second filter 44 extend longitudinally across the housing 12. Various brackets 50 support these filters in their desired position. A manifold 52 is illustrated as positioned adjacent to the back wall 18 of the housing 12. Manifold 52 extends in a generally vertical orientation. The manifold 52 is positioned between the first and second filters 42 and 44 and the back wall 18. Manifold 52, as will be explained hereinafter, serves to receive the flow of the mineral or supplement-containing liquid as pumped from the bottles 34 and 36 and mixes this mineral-containing liquid in the manifold 52 with the filtered water from the first and second filters 42 and 44.

Since it is necessary to pressurize the pre-treated water in order to have the pretreatment water flow through the reverse osmosis filter 44, a diaphragm pump 54 is positioned in the interior of housing 12. Diaphragm pump 54 will receive the pretreated water from the first filter 42, pressurize the water, and then pass the water, under pressure, through the second filter 44 (the reverse osmosis filter). The filtrate from the second filter 44 can then flow into the manifold 52 for the purposes of mixing the minerals with the demineralized water.

It is very important to control the rate and amount of the mineral or supplement-containing liquid from the bottles 34 and 36 that enters the filtered water. As such, a peristaltic pump 56 is used in association with each of the bottles 34 and 36. Peristaltic pump 56 operates in a conventional manner so as to assure the delivery of a desired quantity or rate of mineral-containing liquid to the manifold 52. Peristaltic pumps, as they are known, utilize flexible tubes and rollers so as to pass a fixed amount of fluid flow. The peristaltic pump 56 avoids the use of any valves. Suitable servomotors can be utilized in conjunction with the peristaltic pump 56 so as to control the rate at which the mineral-containing liquid is discharged into the manifold 52.

FIG. 5 further shows that the water mineralization system 10 has special container receptacle assemblies 38 and 40 positioned adjacent to the top 14 of housing 12. Peristaltic pump 56 is positioned on the interior of housing 12 and adjacent to these container receptacle assemblies 38. The close positioning of the peristaltic pump 56 to the container receptacle assemblies 38 and 40 assures the proper operation of the peristaltic pump and the proper delivery of fluid from the bottles 34 and 36. If the peristaltic pump 56 were not positioned adjacent to the container receptacle assemblies 38 and 40, there could be more dosing error associated with the delivery of the mineral-containing liquid from the bottles 34 and 36.

Figure 6:
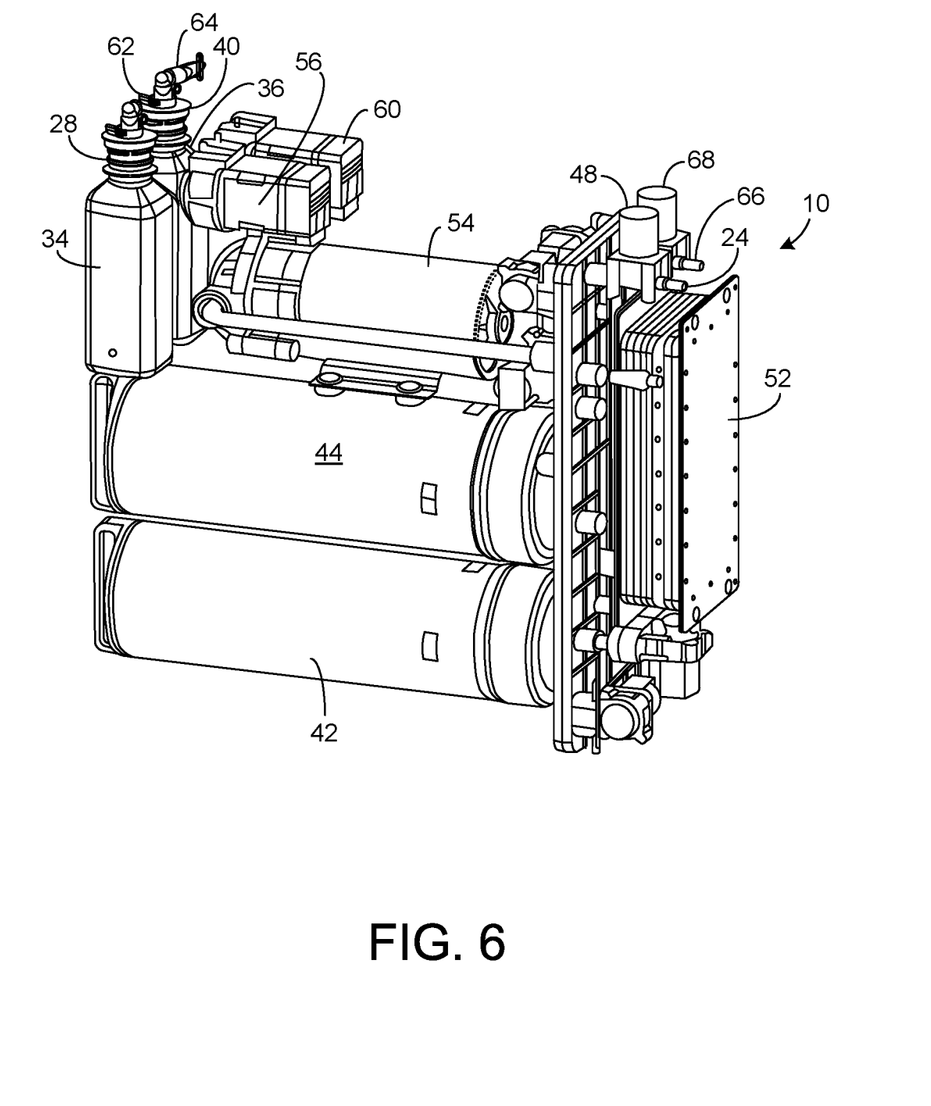
FIG. 6 is an upper perspective view showing the water treatment components associated with the water mineralization system as used in association with the bottle of the present invention.

FIG. 6 shows the interior of the water mineralization system 10 as used with the bottle of the present invention. In particular, FIG. 6 shows the first filter 42 and the second filter 44 arranged one on top of another adjacent to the bottom of the housing. Bottles 34 and 36 are positioned adjacent to the top of the housing. The peristaltic pump 56 is positioned adjacent to the container receptacle assembly 38. Peristaltic pump 60 is positioned adjacent to the container receptacle assembly 40. A line or conduit will extend from the elbows 62 and 64 of the respective container receptacle assemblies 38 and 40 to the respective peristaltic pumps 56 and 60.

FIG. 6 shows the configuration of the inlet 24 and the outlet 66. Inlet 24 receives the tap water into the interior of the housing. Outlet 66 allows for the discharge of mineralized drinking water from the housing. Valve 48 extends outwardly from the inlet 24 and operates to control the flow of water through the inlet 24. Valve 68 is associated with the outlet 66 and can control the flow of mineralized drinking water out of the outlet 66. Initially, the tap water will flow through the inlet 24 and down to the first filter 42 for pretreatment purposes. The outlet of the first filter 42 will flow to the diaphragm pump 54 for pressurization prior to passing to the second filter 44 (the reverse osmosis filter). Ultimately, the filtered water from the reverse osmosis filter 44 will be devoid of minerals. It can then flow into the manifold 52 for mixing with a mineral-containing liquid from bottles 34 and 36. After mixing, the manifold 52 will then pass the flow of the mineralized drinking water to the outlet 66. The manifold 52 can be connected to the outlet 66 of the housing 12 or it can be the outlet of the housing 12.

Figure 7:
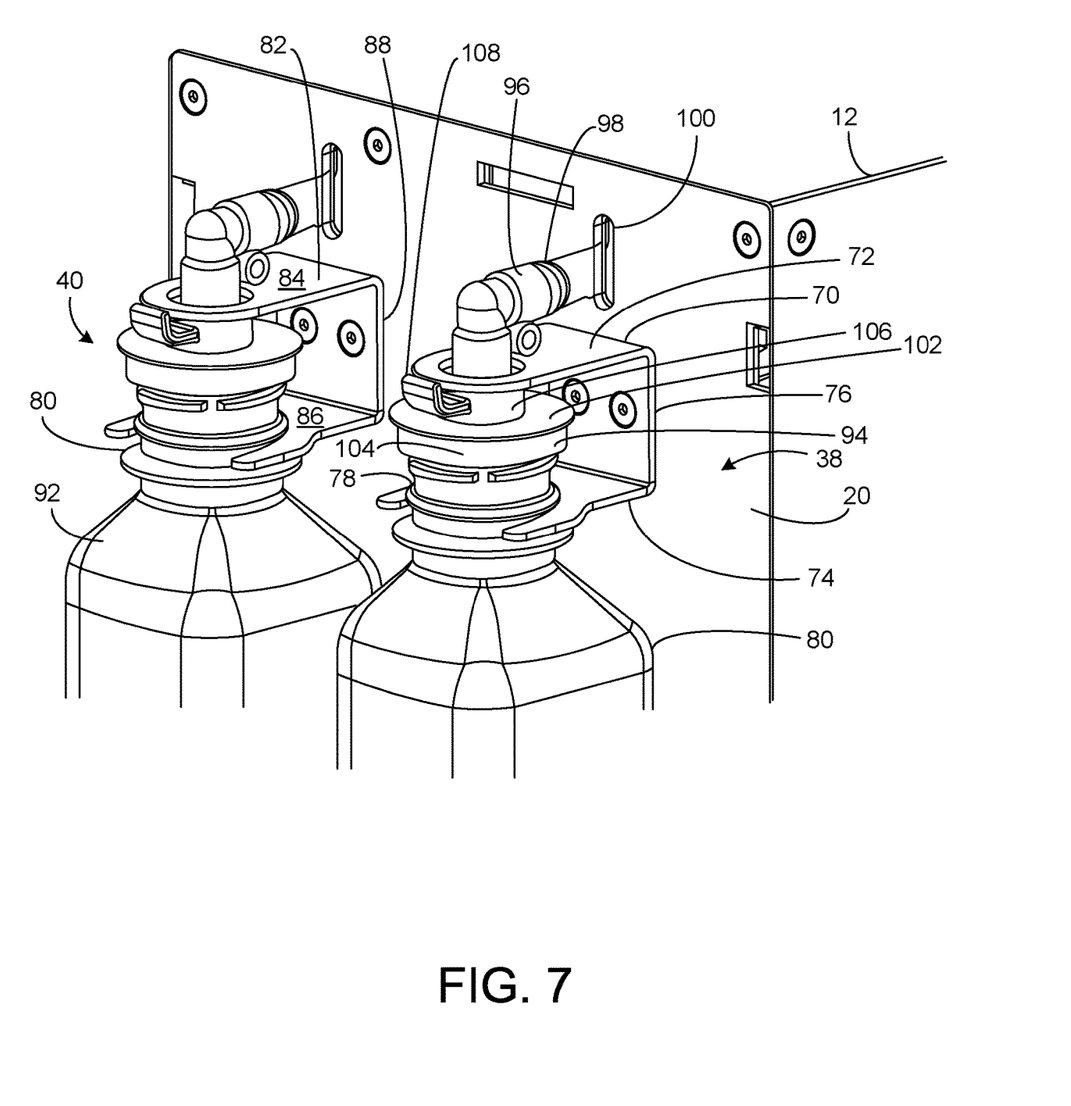
FIG. 7 is an upper perspective close-up view of the container receptacle assembly as used in association with the bottle of the present invention.

FIG. 7 is a detailed view showing the container receptacle assemblies 38 and 40 that receive the bottles of the present invention. It can be seen that the container receptacle assemblies 38 and 40 are mounted to the front wall 20 of housing 12. In particular, the container receptacle assembly 38 has a bracket 70 affixed to the front wall 20 of housing 12. Bracket 70 defines an upper yoke 72 and a lower yoke 74. Upper yoke 72 is in parallel planar relationship to the lower yoke 74. The central portion 76 of the bracket 70 is screwed or bolted to the front wall 20 of the housing 12. It can be seen that the lower yoke 74 is adapted to engage with the neck 78 of bottle 80.

Similarly, the second container receptacle assembly 40 includes bracket 82 affixed to the front wall 20 of housing 12 in side-by-side relationship to the first bracket 70. Once again, the bracket 82 includes an upper yoke 84 and a lower yoke 86 in parallel planar relationship. A central portion 88 is bolted or screwed to the front wall 20 of housing 12. The lower yoke 86 is adapted to receive the neck 90 of bottle 92. The second container receptacle 40 will identical configuration to that of the first container receptacle assembly 38. As such, the description associated hereinafter in association with a first container receptacle assembly 38 applies to the second container receptacle assembly 40.

In FIG. 7, there is an outer cap 94 that extends over the top of the neck 78 of bottle 80. A conduit 96 in the pipe elbow 98 is connected to an upper portion of the outer cap 94 (not shown). The conduit 96 will extend through slot 100 in the front wall 20 of housing 12. It can be seen that the slot 100 has a length which is greater than the diameter of the conduit 96. As such, this provides for a certain amount of "play" during the lifting and lowering of the elbow 98 and the outer cap 94. The upper yoke 72 is adapted to limit an upward travel of the outer 94. The conduit 96 will communicate with the peristaltic pump 56.

The outer cap 94 has a generally planar upper surface 102 and an annular portion 104 extending downwardly from the generally planar upper surface 102. The generally planar upper surface is adapted to be releasably positioned adjacent an opening of the bottle 80. The annular portion 104 surrounds a portion of the neck 78 of the bottle 80. As will be described hereinafter, the outer cap 94 has a nipple (not shown) that extends downwardly from the generally planar upper surface 102. This nipple is adapted to engage with an opening of the bottle 80 so as to draw a portion of the mineral or supplement from the bottle 80. The nipple will be connected to the conduit 96. A clip 106 is removably affixed over an upper portion of the outer cap 98. This clip 106 is interposed between the generally planar upper surface 102 of the outer cap 94 and an underside of the upper yoke 72 of the bracket 70 when the outer cap 94 is positioned over the bottle 80. Clip 106 has an arm 108 extending therefrom. As such, it can be easily inserted or removed over an upper portion of the outer cap 94. The introduction of this clip 106 assures that the upper cap 94 remains in its desired position and that the connections in the interior of the outer cap 94 remain intact, even during the vibration of equipment associated with the system of the present invention.

Figure 8:
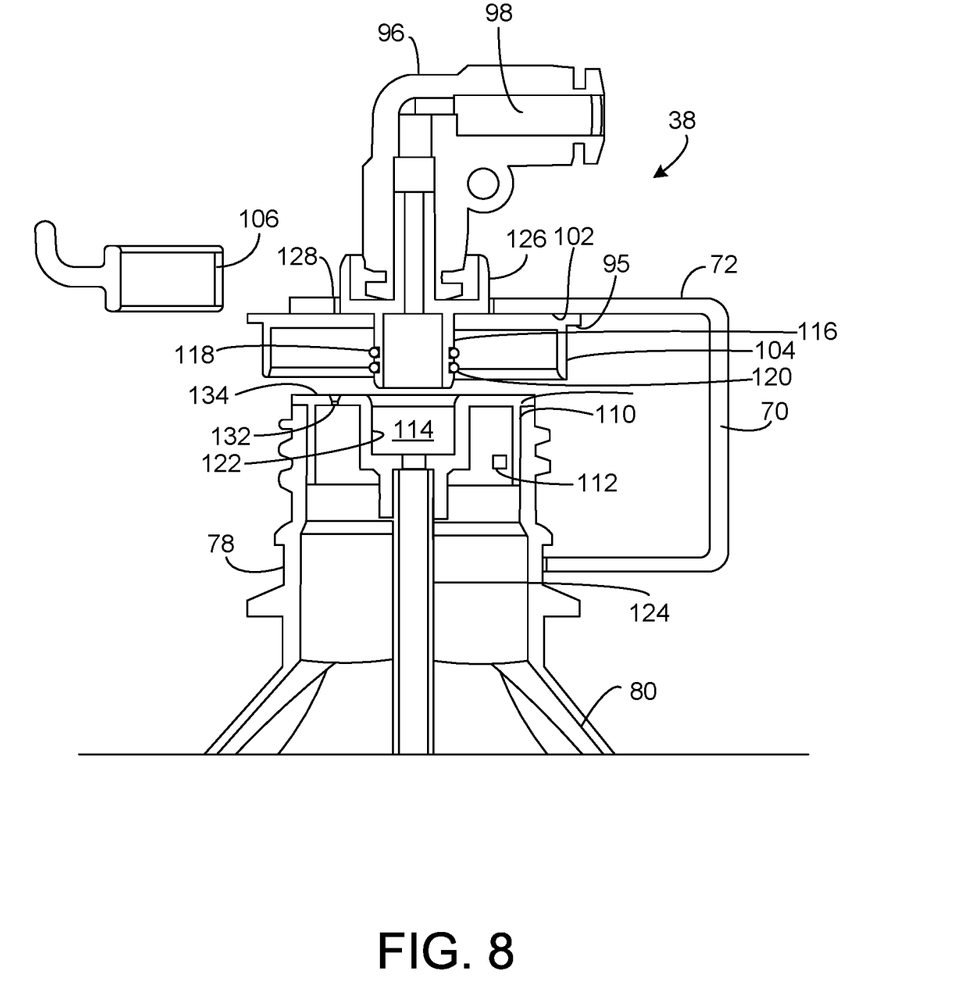
FIG. 8 is a cross-sectional view of the container receptacle assembly as used in association with the bottle of the present invention showing the outer cap separated from the inner cap.

FIG. 8 is a cross-sectional view of the container receptacle assembly 38. A similar construction is associated with the container receptacle assembly 40. In FIG. 8, the bottle 80 has a neck 78 extending upwardly therefrom. The bottle 80 has an opening 110 at the upper end thereof. An inner cap 112 is received in the opening 110 of the bottle 80. This inner cap 112 has a receptacle 114 therein. The receptacle 114 releasably receives the nipple 116 of the outer cap 94. The receptacle 114 is circular. Similarly, the nipple 116 has an annular configuration. As such, O-rings seals 118 and 120 are received in notches formed on the nipple 116. O-rings seals 118 and 120 will engage in a liquid-tight manner with the inner wall 122 of the receptacle 114. This assures a liquid-tight connection between the outer cap 94 and the inner cap 112. The receptacle 114 has a straw 124 extending into the bottle 80. Straw 124 can extend all the way to the bottom of the bottle 80 so as to continue to draw the mineral or supplement-containing liquid from the interior of the bottle 80. The suction exerted by the peristaltic pump 56 will act on the conduit 96 of the pipe elbow 98. As such, the suction force will be drawn through the conduit 98. The suction force (illustrated by the arrow in FIG. 8) is adapted to draw the liquid from the interior of bottle 80 when the nipple 116 is engaged with the receptacle 114.

FIG. 8 illustrates that the outer cap 94 has a generally planar upper surface 102 and an annular portion 104 extending downwardly therefrom. Outer cap 94 also has an upper portion 126 engaged with a convention quick connect/ disconnect coupling with the pipe elbow 96. There is an opening 128 formed in the upper yoke 72 of bracket 70 through which this upper portion 126 extends. The upper portion 126 can move up and down freely through this opening 128. The clip 106 is illustrated as having been removed from the space between the outer cap 94 and the inner cap 12.

In FIG. 8, there is shown that the upper surface 130 of the inner cap 112 has a hole 132 formed therethrough. Hole 132 is a vacuum-breaking air passage. As such, the open air flow will avoid any vacuum locks that could otherwise occur within the interior of the bottle 80. Importantly, an air filter material 134 is positioned over the hole 132 or into the hole 152. This air filter material 134 can be in the nature of N95 facemask material. As such, it filters 95% of airborne bacteria. Ultimately, the air filter material 134 blocks airborne contaminants from entering the interior of the bottle 80 while allowing airflow through the hole 132. The air filter material 134 will further assure that there is enough space between the outer cap 94 and the inner cap 112 so as to allow airflow therebetween.

Figure 9:
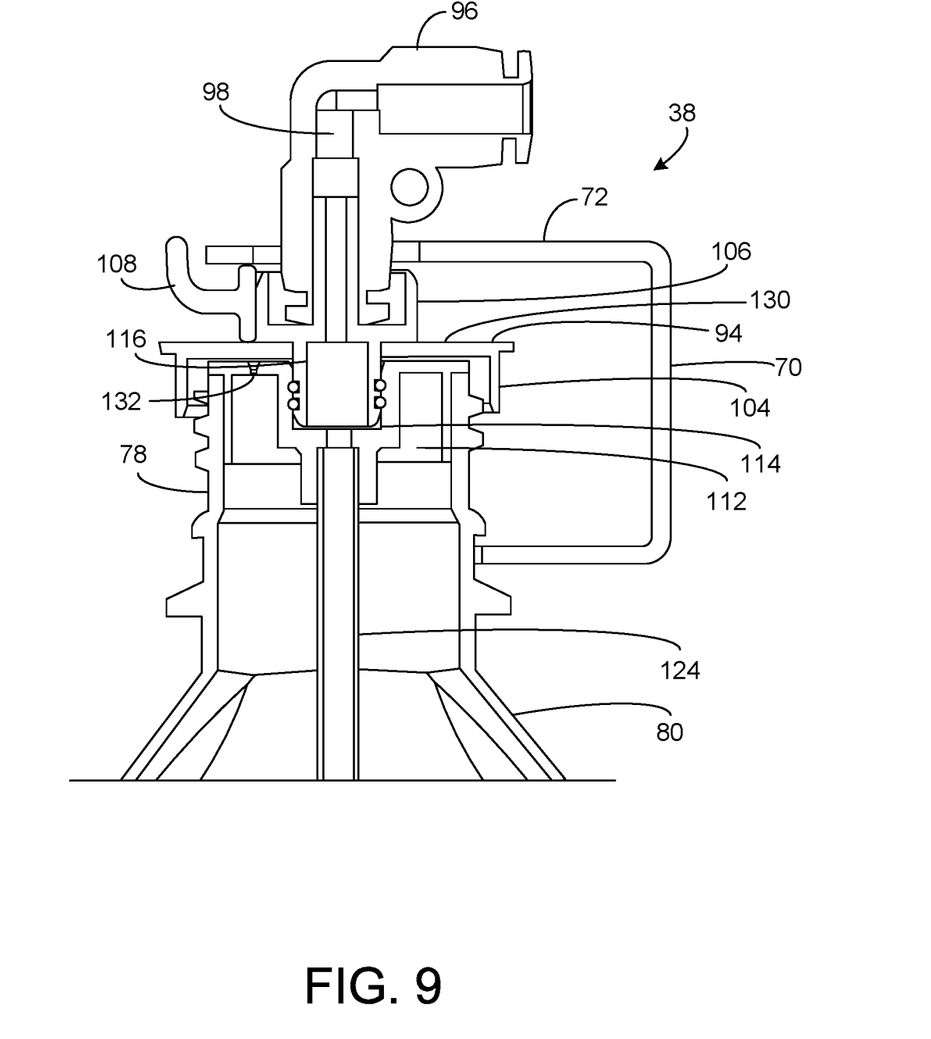
FIG. 9 is a cross-sectional view of the container receptacle assembly as used in association with the bottle of the present invention with the upper cap engaged with the lower cap of the bottle and with the clip in position.

FIG. 9 shows the container receptacle assembly 38 with the connections made between the outer cap 94 and the inner cap 112. FIG. 9 shows that the nipple 116 is received within the receptacle 114. The liquid-tight seal is established by the O-rings seals extending around the circumference of the nipple 116. The outer cap 94 will have the annular portion 104 extending in spaced relationship around the neck 78 of the bottle 80 and over the opening of the bottle. The straw 124 will then communicate with the receptacle 114 and be in fluid communication with the conduit 98 of elbow 96. As such, the peristaltic pump 56 can draw the liquid from the bottle 80 into the straw 124, into the receptacle 114, through the conduit 98, and ultimately to the manifold for mixing with the filtered water. The underside of the top surface 130 of the outer cap 94 will be generally adjacent to the upper surface of the inner cap 112 and spaced slightly so that airflow can pass through the air filter material and into the hole 132 so as to break any vacuum that could occur within the interior of the bottle 80 or within the system of the present invention.

FIG. 9 shows that the clip 106 is installed between the upper yoke 72 of bracket 70 and the top surface 130 of the outer cap 94. Arm 108 of clip 106 extends outwardly of the upper yoke 72 for easy access. The placement of the clip 106 in the manner shown in FIG. 9 assures that the nipple 116 is properly positioned in the receptacle 114. Clip 106 assures that this proper seating and connection of the various components is assured even during vibrations of the water mineralizing system 10 of the present invention.

In order to remove the bottle 80, it is only necessary to first remove the clip 106 from its position between the top surface 130 of the outer cap 94 and the underside of the upper yoke of bracket 70. This is carried out by simply grabbing the arm 108 and sliding the clip 106 outwardly of the bracket 70. Next, the elbow 96 can be lifted so as to slide within the slot 100 at the front face 20 of the housing 12. This will cause the nipple 116 to separate from the receptacle 114. The annular portion 104 will then separate from its position surrounding the neck 78 of bottle 80. The bottle 80, along with the inner cap 112 received therein, can be separated from the outer cap 94 and from the bracket 70. A new bottle can then be inserted into position, the yoke 96 lowered, the nipple 116 received within the receptacle 114, and a new connection is easily and simply established.

A control system can be employed the present invention so as to control the rate of operation of the peristaltic pump and the other components of the system. The control system can be manually operated or operated with a touchscreen so that the user can input the type of mineral to be introduced into the system, the rate of introduction of the mineral into the system, the amount of minerals to be introduced into the demineralized water, and other features. For example, under certain circumstances, an athlete may desire more minerals to be mixed with the water than an average person. Other persons may have taste preferences and will desire less or more of a particular mineral. As such, the present invention is adaptable to a wide variety of needs and desires. Ultimately, the system is controllable in such a way as to produce an optimal mineralized water output for consumption by individuals.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A bottle for use with a system for mineralizing drinking water, the bottle comprising:

a body having a neck extending outwardly therefrom, said body having a bottom and an interior volume, the neck defining an opening at an upper end of said body;

an inner cap fixedly positioned in the opening of said body, said inner cap having an upper surface affixed over the opening of said body, said inner cap having an annular portion extending downwardly from the upper surface, the annular portion bearing against an inner wall of the neck of said body, said inner cap having a receptacle opening at the upper surface, the receptacle having a channel opening at a bottom of the receptacle so as to open to the interior volume of said body, said inner cap having a straw extending into the interior volume of said body, the straw having an end positioned adjacent the channel at the bottom of the receptacle so as to open to the receptacle, the receptacle adapted to receive a nipple of the system for mineralizing water therein.

2. The bottle of claim 1, the straw having an end positioned in proximity to the bottom of said body.

3. The bottle of claim 1, said inner cap being formed of an elastomeric material.

4. The bottle of claim 3, said body being formed of a glass material.

5. The bottle claim 1, the neck of the body having at least one ridge or thread extending outwardly of an outer diameter of the neck.

6. The bottle of claim 1, further comprising:
a cap threadedly and removably positioned over the opening at the upper end of said body.

7. The bottle of claim 1, further comprising:
a mineral-containing liquid received in the interior volume of said body.

8. A bottle for use with a system for mineralizing drinking water, the bottle comprising:
a body having a neck extending outwardly therefrom, said body having a bottom and an interior volume, the neck defining an opening at an upper end of said body; and
an inner cap fixedly positioned in the opening of said body, said inner cap having an upper surface affixed over the opening of said body, said inner cap having an annular portion extending downwardly from the upper surface, the annular portion bearing against an inner wall of the neck of said body, said inner cap having a receptacle opening at the upper surface, said the receptacle having a channel opening at a bottom of the receptacle so as to open to the interior volume of said body, the upper surface of said inner cap having a hole formed therethrough, the hole positioned away from the receptacle, the hole having an air filter material affixed to a top of the upper surface of said inner cap so as to cover the hole, the air filter material adapted to allow air flow into the interior of said body and to block airborne contaminants from entering the interior volume of said body.

9. An apparatus comprising:
a system adapted to filter and mineralize water, said system having a container receptacle assembly formed or affixed thereto, the container receptacle assembly having an inlet, the container receptacle assembly having a nipple thereon at the inlet;
a bottle having a neck extending outwardly therefrom, the neck defining an opening at an upper end of said bottle, the bottle having a bottom and an interior volume; and
an inner cap fixedly positioned in the opening of said bottle, said inner cap having an upper surface affixed over the opening of said bottle, said inner cap having an annular portion extending downwardly from the upper surface, the annular portion bearing against an inner wall of the neck of said bottle, said inner cap having a receptacle opening at the upper surface, said inner cap having a channel formed at a bottom of the receptacle so as to open to the interior volume of said bottle, the nipple of said container receptacle assembly positionable in the receptacle of said inner cap and adapted to draw liquid from said bottle and to pass the liquid into said system, said inner cap having a straw extending into the interior volume of said bottle, the straw having an upper end positioned at the channel of the receptacle, the nipple of the inlet of the container receptacle assembly being in releaseable communication with the straw, the upper surface of said inner cap having an air filter material overlying the hole so as to allow air flow into the interior volume of said container and to block airborne contaminants from entering the interior volume of said bottle.

10. The apparatus of claim 9, said system having a bracket affixed thereto, said bracket defining an upper yoke and a lower yoke, the lower yolk releasably engaging the neck of said bottle.

11. The apparatus of claim 9, the liquid being a mineral-containing liquid.

12. The apparatus of claim 9, said inner cap being formed of an elastomeric material, said body being formed of a glass material.

* * * * *